(12) United States Patent
Ampunan et al.

(10) Patent No.: US 7,856,297 B2
(45) Date of Patent: Dec. 21, 2010

(54) METHOD AND SYSTEM FOR INFORMING A VEHICLE TELEMATICS USER OF A CONNECTION STATUS

(75) Inventors: Nathan Ampunan, Novi, MI (US); Carl J. Hering, Farmington Hills, MI (US); Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 1069 days.

(21) Appl. No.: 11/601,443

(22) Filed: Nov. 17, 2006

(65) Prior Publication Data

US 2008/0119240 A1 May 22, 2008

(51) Int. Cl.
*G01M 17/00* (2006.01)
(52) U.S. Cl. .................. 701/29; 455/569.2
(58) Field of Classification Search ............ 379/265.01; 455/569.2; 701/29
See application file for complete search history.

(56) References Cited

U.S. PATENT DOCUMENTS

| | | | |
|---|---|---|---|
| 6,198,942 B1 | 3/2001 | Hayashi et al. | |
| 6,282,491 B1 | 8/2001 | Bochmann et al. | |
| 6,535,743 B1 | 3/2003 | Kennedy, III et al. | |
| 6,996,397 B2 | 2/2006 | Fraser et al. | |
| 2001/0012335 A1 | 8/2001 | Kaufman et al. | |
| 2002/0142803 A1 | 10/2002 | Yamamoto | |
| 2003/0065441 A1 | 4/2003 | Funk | |
| 2004/0190693 A1 | 9/2004 | Beiermeister | |
| 2004/0198332 A1 | 10/2004 | Lundsgaard | |
| 2004/0203630 A1 | 10/2004 | Wang | |
| 2004/0203632 A1 | 10/2004 | Schaaf | |
| 2004/0214525 A1 | 10/2004 | Ahn et al. | |
| 2005/0090237 A1 | 4/2005 | Holt et al. | |
| 2005/0102074 A1* | 5/2005 | Kolls | 701/29 |
| 2005/0107072 A1 | 5/2005 | True et al. | |
| 2005/0152531 A1 | 7/2005 | Hamilton, II et al. | |
| 2005/0254460 A1 | 11/2005 | Fraser et al. | |
| 2006/0079207 A1 | 4/2006 | Kamdar et al. | |
| 2006/0128365 A1 | 6/2006 | Kamdar et al. | |
| 2006/0136105 A1* | 6/2006 | Larson | 701/30 |
| 2006/0258377 A1 | 11/2006 | Economos et al. | |

* cited by examiner

*Primary Examiner*—Creighton Smith
(74) *Attorney, Agent, or Firm*—Dierker & Associates, P.C.

(57) ABSTRACT

A method for informing an in-vehicle telematics unit user of a connection status generally includes establishing a connection between the telematics unit and a call center, and initiating communication between the user and a call center service advisor. Next, the communication may be temporarily suspended while maintaining the connection. A connection status signal informing the user of the status of the connection is transmitted from the call center to the telematics unit during the temporary suspension in communication. After the signal is transmitted, the communication between the user and the call center service advisor is ultimately restored.

20 Claims, 3 Drawing Sheets

METHOD AND SYSTEM FOR INFORMING A VEHICLE TELEMATICS USER OF A CONNECTION STATUS

TECHNICAL FIELD

The present disclosure relates generally to in-vehicle telematics units, and more particularly to a method and system for informing a user of a connection status.

BACKGROUND

Communication(s), established via a connection between a call center advisor and a telematics unit user, may be utilized to request and provide various user services. After communication is established, a call center advisor may initiate a temporary suspension in communication with a user while maintaining the connection (i.e., placing the user on hold). The user may be placed on hold for any length of time, typically ranging from a few seconds to several minutes.

While on hold, the user may generally hear music selected by the call center, a pre-recorded message, or silence through the receiver. In the latter situation, after some amount of time elapses, the user may feel unsure as to whether the connection with the call center advisor remains active. In such instances, the user may terminate the connection and initiate a new connection, for example by "hanging up" and requesting a new communication. The call center advisor communicating with the user via the new connection may not be the same advisor with whom the user/subscriber was previously communicating. As such, the newly contacted advisor may attempt to locate the previous advisor, or may reinitiate fulfilling the requested service. This may actually increase the time for fulfilling requested services, and may undesirably and unnecessarily occupy more than one service advisor.

Thus, it would be desirable to provide a method for informing a vehicle telematics user of the status of his/her communication connection.

SUMMARY

A method for informing an in-vehicle telematics unit user of a connection status generally includes establishing a connection between the telematics unit and a call center, and initiating communication between the user and a call center service advisor. The communication may be temporarily suspended while maintaining the connection. A connection status signal informing the user of the status of the connection is transmitted from the call center to the telematics unit during the temporary suspension in communication. The communication between the user and the call center service advisor is restored.

BRIEF DESCRIPTION OF THE DRAWINGS

Features and advantages of embodiments of the present disclosure will become apparent by reference to the following detailed description and drawings, in which like reference numerals correspond to similar, though not necessarily identical, components. For the sake of brevity, reference numerals or features having a previously described function may not necessarily be described in connection with other drawings in which they appear.

DETAILED DESCRIPTION

Embodiment(s) of the system and method(s) disclosed herein advantageously allow an in-vehicle telematics unit user to receive notice of a connection status via the telematics unit during a temporary suspension in communication with a call center. Embodiment(s) of the system and method(s) may also advantageously allow the user to audibly receive a preferred audio output during the temporary suspension in communication. It is believed that such a method and/or system may provide for improved communication between a user and the call center.

It is to be understood that, as defined herein, a user may include vehicle operators and/or passengers and may be used interchangeably with subscribers/service subscribers.

Figure 1:
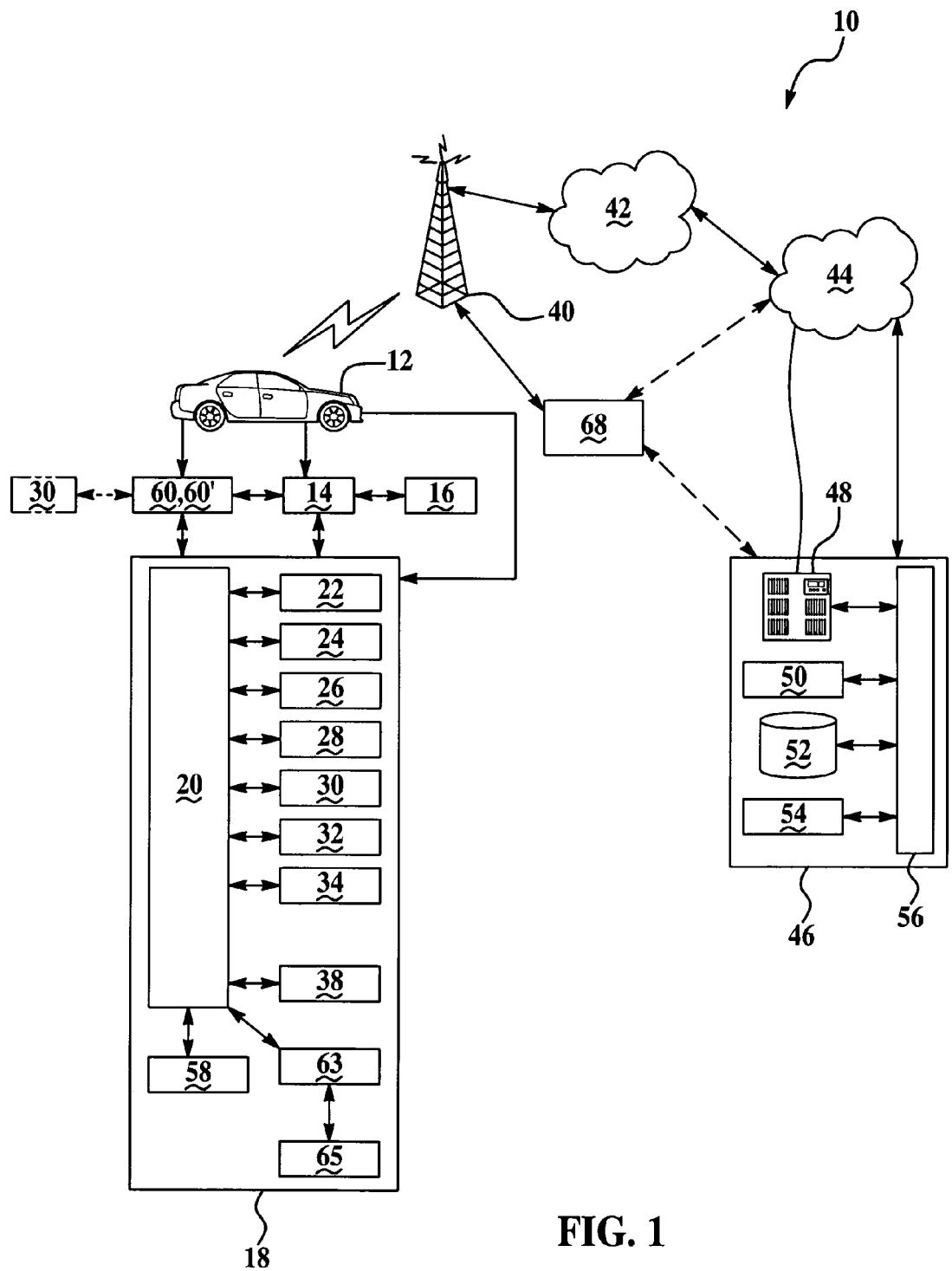
FIG. 1 is a schematic diagram depicting an embodiment of a system for informing an in-vehicle telematics unit user of a connection status.

Referring now to FIG. 1, the system 10 includes a vehicle 12, a vehicle communications network 14, a telematics unit 18, a wireless communication system (including, but not limited to, one or more wireless carrier systems 40, one or more communication networks 42, one or more land networks 44), and one or more call centers 46. In an embodiment, the wireless communication system is a two-way radio frequency communication system. In another embodiment, the wireless communication system includes one or more call centers 46 and/or one or more Internet-enabled programs 68. In yet another embodiment, vehicle 12 is a mobile vehicle with suitable hardware and software for transmitting and receiving voice and data communications. System 10 may include additional components suitable for use in telematics units 18.

Internet-enabled program(s) 68 may aid in sending and/or receiving data and communications. In an embodiment, the Internet-enabled program(s) 68 enable content delivery via packet data (i.e., over-the-air transmission control protocol/Internet protocol (TCP/IP)). In another embodiment, an Internet-enabled program 68 transmits signals and/or data via a short message service (SMS). In yet another embodiment, an Internet-enabled program(s) 68 facilitates the transmission of voice communications via voice over Internet protocol (VoIP).

In an embodiment, via vehicle communications network 14, the vehicle 12 sends signals from the telematics unit 18 to various units of equipment and systems 16 within the vehicle 12 to perform various functions, such as unlocking a door, executing personal comfort settings, and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limiting example of which includes a Wide Area Network (WAN) transceiver), and/or combinations thereof.

Telematics unit 18 may include a processor 20 operatively coupled to a wireless modem 22, a location detection system 24 (a non-limiting example of which is a global positioning system (GPS)), an in-vehicle memory 26, a microphone 28, one or more speakers 30, an embedded or in-vehicle mobile phone 32, a real-time clock (RTC) 34, a short-range wireless communication network 38 (e.g. a Bluetooth® unit), a user interface 63, and/or a user interface panel 65.

Further, telematics unit 18 may include additional components and functionality as desired for a particular end use. It is to be understood that the telematics unit 18 may also be implemented without one or more of the above listed components, such as, for example, speakers 30. Additionally, it is to be understood that the speaker(s) 30 may be a component of the vehicle audio entertainment system 60 (which includes a receiver 60').

In an embodiment, the vehicle audio entertainment system 60 is in operative and selective communication with the telematics unit 18. The vehicle audio entertainment system 60 may be configured, in addition to accepting and outputting radio broadcasts, to accept and output audio and other signals. The vehicle audio entertainment system 60 may be adapted to output audio signals (i.e., an audio output) embodied in one or more of a variety of formats. For example, the audio entertainment system 60 may output audio signals from FM radio, AM radio, satellite radio, a compact disc (CD), a digital audio file (such as, for example, an .mp3 file), a cassette tape, a minidisk, an 8-track tape, and/or a combination thereof.

Processor 20 may be a micro controller, a controller, a microprocessor, a host processor, and/or a vehicle communications processor. In another embodiment, processor 20 may be an application specific integrated circuit (ASIC). Alternatively, processor 20 may be a processor working in conjunction with a central processing unit (CPU) performing the function of a general-purpose processor.

Non-limiting examples of the location detection system 24 associated with processor 20 include a Global Position Satellite receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). In-vehicle mobile phone 32 may be a cellular type phone, such as, for example an analog, digital, dual-mode, dual-band, multi-mode and/or multi-band cellular phone.

Also associated with processor 20 is the previously mentioned real time clock (RTC) 34, which provides accurate date and time information to the telematics unit hardware and software components that may require date and time information. In one embodiment, date and time information may be requested from the RTC 34 by other telematics unit components. In other embodiments, the RTC 34 may provide date and time information periodically, such as, for example, every ten milliseconds.

Processor 20 may execute various computer programs that interact with operational modes of electronic and mechanical systems within the vehicle 12. It is to be understood that processor 20 controls communication (e.g., call signals) between telematics unit 18, wireless carrier system 40, call center 46, and Internet-enabled program 68.

Further, processor 20 may generate and accept digital signals transmitted between the telematics unit 18 and the vehicle communication network 14, which is connected to various electronic modules in the vehicle 12. In one embodiment, these digital signals activate the programming mode and operation modes within the electronic modules, as well as provide for data transfer between the electronic modules. In another embodiment, certain signals from processor 20 may be translated into vibrations and/or visual alarms.

It is to be understood that software 58 may be associated with processor 20 for monitoring and/or recording the incoming caller utterances.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 40 to the call center 46 and/or to the Internet-enabled program 68. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones. It is to be understood that the communications network 42 and the land network 44 connect the wireless carrier system 40 to the call center 46 and/or the Internet enabled program 68.

Call center 46 may contain one or more data switches 48, one or more communication services managers 50, one or more communication services databases 52 containing subscriber profile records and/or subscriber information, one or more communication services advisors 54, and one or more network systems 56.

It is to be understood that, although a service provider may be located at the call center 46, the call center 46 is a separate and distinct entity from the service provider. In an embodiment, the service provider is located remote from the call center 46. A service provider provides the user with telephone and/or Internet services. In an embodiment, the service provider is a wireless carrier (such as, for example, Verizon Wireless®, Cingular®, Sprint®, etc.). It is to be understood that the service provider may interact with the call center 46 to provide service(s) to the user.

Switch 48 of call center 46 may connect to land network 44. Switch 48 may transmit voice or data transmissions from call center 46, and may receive voice or data transmissions from telematics unit 18 in vehicle 12 through wireless carrier system 40, communications network 42, and land network 44. As such, a connection between the telematics unit 18 and the call center 46 may be established via the wireless carrier system 40, communications network 42, and/or land network 44. Switch 48 may receive data transmissions from, or send data transmissions to one or more communication service managers 50 via one or more network systems 56.

Call center 46 may contain one or more service advisors 54. In one embodiment, a service advisor 54 is human. In another embodiment, a service advisor 54 is an automaton. It is to be understood that the service advisor 54 may be located at the call center 46 or may be located remote from the call center 46 while communicating therethrough.

Communication may be accomplished via voice mode or data mode. Voice mode communications generally occur between the user and the service advisor 54 or some other third party. Data mode communications generally occur between the telematics unit 18 and components of the call center 46 or service provider. In an embodiment, the communication is established via a connection extending (e.g., via the wireless communication system) between the telematics unit 18 and the call center 46.

In the embodiments disclosed herein, verbal communication (voice mode) may take place via microphone 28 coupled to the in-vehicle or mobile phone 32 associated with the telematics unit 18. In an embodiment, caller utterances into the microphone 28 are received at the call center 46, which may tokenize the utterance stream for further processing. In another embodiment, the tokenized utterances are placed in a subscriber information database 52 at the call center 46.

Communication between a telematics unit 18 user and a service advisor 54 (or between a telematics unit 18 and components of the call center 46) may be initiated automatically, or may be initiated by the user or the service advisor 54. In an embodiment, the user may initiate a call or a request, such as, for example, for telephone communication or a navigation communication, via an input system in communication with the telematics unit 18 and/or the two-way radio frequency communication system. Initiation of the communication may be verbal and/or via a physical motion. As such, the input system may include an alphanumeric keypad, a microphone 28, a menu selection system, and/or combinations thereof.

Figure 2:
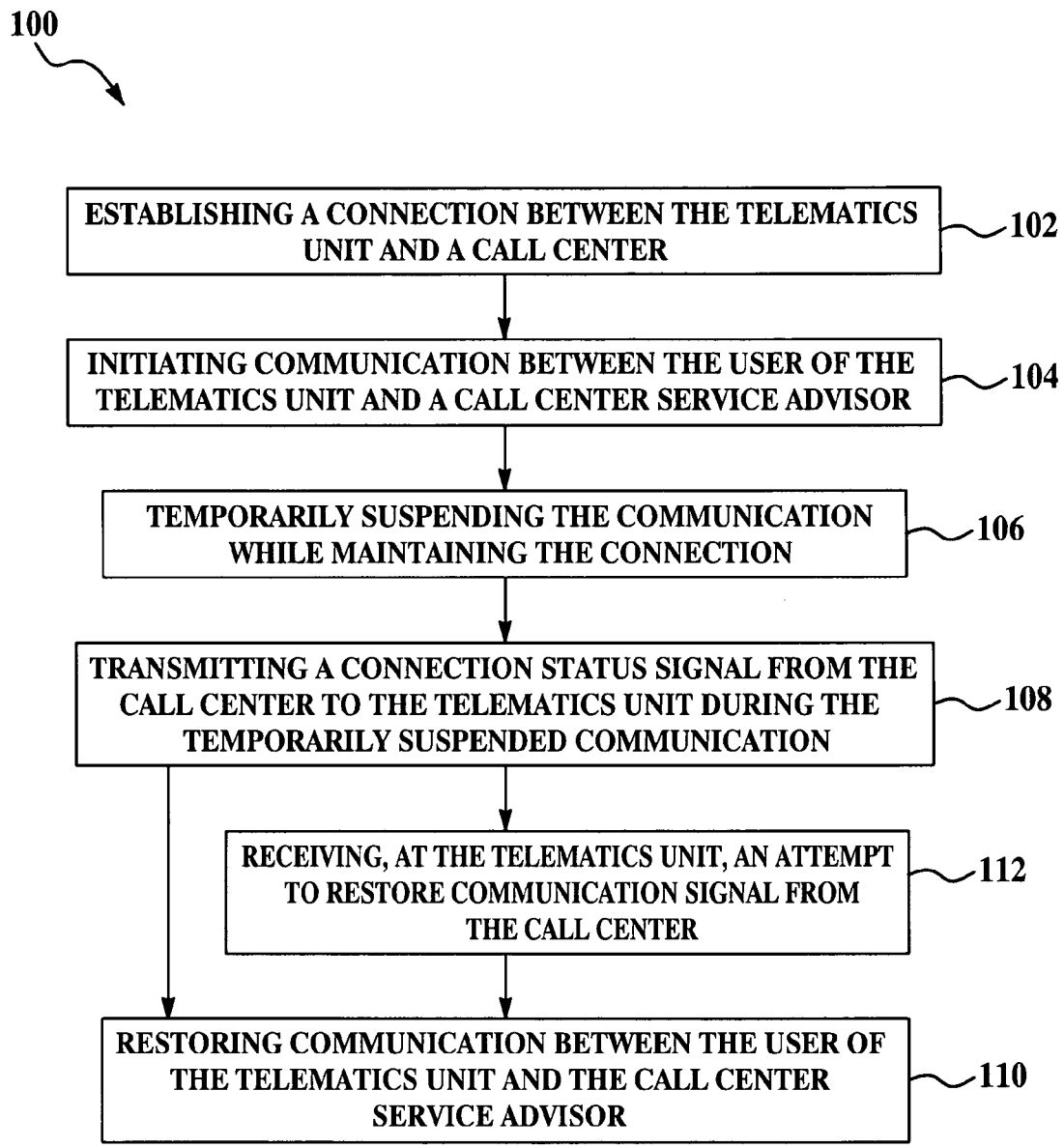
FIG. 2 is a flow diagram depicting an embodiment of a method for informing an in-vehicle telematics unit user of a connection status.

Referring now to FIG. 2, an embodiment of the method for informing a vehicle telematics unit 18 user of a connection status is shown generally at reference numeral 100. This embodiment of the method 100 includes establishing a connection between the telematics unit 18 and the call center 46, as depicted at reference numeral 102; and initiating communication between the user of the telematics unit 18 and the call center service advisor 54, as depicted at reference numeral 104. The communication is temporarily suspended while the connection is maintained, as depicted at reference numeral 106. A connection status signal is transmitted from the call center 46 to the telematics unit 18 during the temporary suspension in communication, as depicted at reference numeral 108. The communication between the user and the call center service advisor 54 is ultimately restored, as depicted at reference numeral 110.

The embodiment of the method 100 shown in FIG. 2 may also include receiving, at the telematics unit 18, an "attempt to restore communication" signal from the call center 46, as shown at reference numeral 112. In an embodiment, the receiving takes place prior to restoring communication between the user and the call center service advisor 54 (shown at reference numeral 110). In response to receiving the attempt to restore communication signal, the telematics unit 18 restores the communication between the user and the call center service advisor 54, as depicted at reference numeral 110.

As previously described, the connection between the telematics unit 18 and the call center 26 is accomplished via the components of the wireless communication system. In the embodiments shown in FIG. 2, communication is established between the user and the service advisor 54.

After being established, the communication between the user and the service advisor 54 may be temporarily suspended (e.g., the user is placed "on hold"), while the connection therebetween is maintained. The temporary suspension in communication may be desirable for one or more reasons. In a non-limiting example, communication is suspended while the service advisor 54 provides assistance to the user. Non-limiting examples of such assistance include researching a desired product or service for the user, attempting to connect the user to a third party (e.g., one or more emergency service providers), and/or the like, and/or combinations thereof. More specifically, in an embodiment, communication is suspended while the call center 46 researches flight/airline information, restaurant information, points of interest information, weather information, news, navigational directions, audio/video service information, entertainment service information, directory information, and/or the like, and/or combinations thereof.

Temporarily suspending communication between the telematics unit 18 user and the call center service advisor 54 includes temporarily suspending a communication line between the user and the call center service advisor 54. A "communication line", as used herein, refers to the open two-way communication between the user and the service advisor 54. When the communication line is temporarily suspended, the connection is maintained, but the user and the service advisor 54 cannot hear each other. A suspended communication line is substantially equivalent to placing a caller on hold. It is to be understood that the service advisor 54 is capable of temporarily suspending the communication line.

The call center 46 transmits a connection status signal to the telematics unit 18 during the temporary suspension in communication. In an embodiment, the call center 46 automatically transmits the signal in response to the temporary suspension. In another embodiment, the service advisor 54 initiates transmission of the signal.

The signal may include one or more audio signals, visual signals, tactile signals, and/or combinations thereof. As previously stated, the signal is a connection status signal, which informs the user of the status of the connection between the call center 46 and the telematics unit 18. In an embodiment, the connection status signal is a light, sound or vibration that signifies to the user that the connection is still active. As non-limiting examples, the signal may include a light emitting diode (LED) emission (e.g., a blinking light that continues throughout the temporary suspension), an audio message output (e.g., a pre-recorded message transmitted from the call center 46 stating, for example, "please hold while the advisor completes your request") at predetermined intervals, a visual message displayed on the user interface panel 65 (e.g., a Driver Information Center (DIC) or Display (DID)), and/or a vibration detectable on the steering wheel or in the seat.

The connection status signal may, in addition to or as an alternative to the light/sound/vibration, include progression information, or information relating to the progress of the communication or a service being performed. As an example, pre-recorded messages informing the user of progress advances may be played during the temporary suspension. In an embodiment, the progression information is context specific and informs the user of the reason for the temporary suspension and/or the status of the actions of the service advisor 54 handling the communication. As non-limiting examples, the signal may provide the user with messages such as, for example, "accessing map database," "generating route instructions," "downloading route instructions," and/or the like. As another non-limiting example, the signal may notify the user of the estimated time remaining until the end of the suspension in communication (i.e., estimated wait time). In another embodiment, the progression information is not context sensitive and, thus, provides notice that the connection is being maintained (i.e., is active) without providing specific information as to the reason for the temporary suspension and/or as to the progress of the advisor 54 handling the call.

Notice of the connection status is provided to a user via a notification system that is operatively connected to the telematics unit 18. The notification system may include the audio entertainment system 60, the interface panel 65, any tactile device, or any other component that is capable of transmitting the signal from the telematics unit 18 to the user. As previously described, the connection status signal may be transmitted in the form of an audio notice, a visual notice, and/or a tactile notice. In an embodiment, the notification system includes the audio entertainment system 60, which audibly outputs (plays, provides, etc.) the signal via speakers 30. In another embodiment, the notification system includes the user interface panel 65, which digitally displays a visual notice to the user. In still another embodiment, the signal (e.g., a signal including progression information) may be presented on divergent media. As an example, the signal may be both visual and audible, and may be presented to a user substantially simultaneously.

In one embodiment of the method, the telematics unit 18 receives the connection status signal, and in response thereto, activates the audio entertainment system 60. Activation of the audio entertainment system 60 emits an audio output (e.g., a radio broadcast, music from a compact disc, etc.) while the communication line remains suspended. In an embodiment, the advisor 54 informs the user that the communication line will be temporarily suspended. Upon recognition of the suspension of the line, the telematics unit 18 activates the audio entertainment system 60. In an embodiment, activation of the audio entertainment system 60 is accomplished by the telematics unit 18 sending an activation signal to the system 60 via the vehicle communications network 14. It is to be understood that the user may select the audio output at the time of the temporary suspension, or the user may have preselected the audio output.

In an embodiment, the telematics unit 18 is adapted to receive a second signal from the call center 46. This signal is an "attempt to restore communication" signal, which indicates to the telematics unit 18 that the service advisor 54 is ready for the communication line to be restored. In response to the attempt to restore communication signal from the call center 46 (e.g., initiated by advisor 54), the telematics unit 18 restores the communication between the user and the service advisor 54. It is to be understood that restoring the connection results in the restoration of the previously suspended communication line. In an embodiment in which the audio entertainment system 60 is activated during the temporary suspension, the telematics unit 18 deactivates the audio entertainment system 60, and restores the communication line between the user and the call center service advisor 54. As such, the telematics unit 18 may be capable of switching from the suspended communication line to the audio entertainment system 60 in response to a connection status signal, and may be capable of switching to the restored (i.e., previously suspended) communication line from the audio entertainment system 60 in response to the attempt to restore communication signal.

Figure 3:
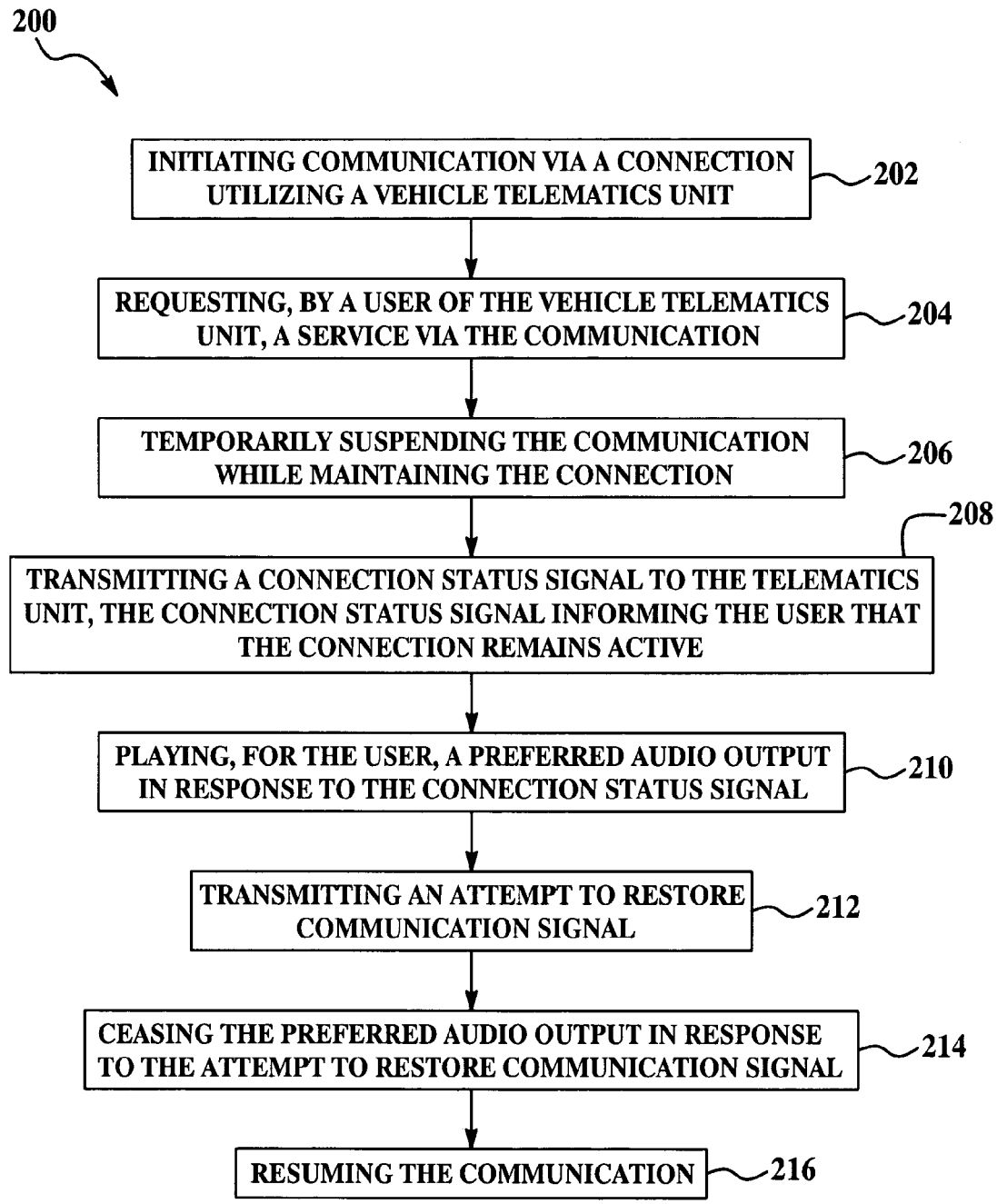
FIG. 3 is a flow diagram depicting an embodiment of a method of indicating that a connection for communication is active.

Referring now to FIG. 3, an embodiment of a method of indicating that a connection for communication is active is generally depicted at reference numeral 200. The embodiment of the method 200 includes initiating a communication via a connection utilizing a vehicle telematics unit 18, as depicted at reference numeral 202; and requesting, by a user of the telematics unit 18, a service via the communication, as depicted at reference numeral 204. Similar to the embodiment of the method 100 shown in FIG. 2, this embodiment of the method 200 includes temporarily suspending the communication while maintaining the connection, as depicted at reference numeral 206; and transmitting, to the telematics unit 18, a connection status signal informing the user that the connection remains active, as depicted at reference numeral 208. As depicted in FIG. 3, a preferred audio output is played for the user in response to the connection status signal, as depicted at reference numeral 210. In an embodiment, the preferred audio output is played via the audio entertainment system 60. Yet further, the embodiment of the method 200 includes transmitting an "attempt to restore communication" signal, as depicted at reference numeral 212; ceasing the preferred audio output in response to the attempt to restore communication signal, as depicted at reference numeral 214; and resuming the communication in response to the attempt to restore communication signal, as depicted at reference numeral 216.

As used herein, a "preferred audio output" may include any suitable audio output capable of being emitted over the vehicle audio entertainment system 60. In an embodiment, the preferred audio output is a desired emission selected by a vehicle 12 passenger.

As previously described in reference to FIG. 2, the connection status signal is configured to provide notice to the user of the status of the connection (e.g., the connection is still active) at regular or irregular time intervals. It is to be understood that one signal may be sent, or multiple signals may be sent simultaneously or sequentially. Multiple signals sent sequentially are generally provided to update the user of the status of the connection. This may be especially desirable when the temporarily suspended communication extends beyond a desirable time period. As depicted in the embodiment of FIG. 3, during the temporary suspension, the telematics unit 18 switches to the vehicle audio entertainment system 60. It is to be understood that the transmission of multiple signals may occur simultaneously with the audio output, for example, if the signals are visual or tactile. It is to be further understood that if the connection status signal(s) are audio signals, the telematics unit 18 is capable of stopping/suspending the emission of the preferred audio output during transmission/receipt of the connection status signal(s).

As a non-limiting example, if the connection status signal, including a notice adapted for aural emission, is transmitted to the telematics unit 18, the preferred audio output may be suspended while the aural connection status signal is played in the vehicle 12. It is to be understood that playing of the preferred audio emission may be resumed after the signal is transmitted. As such, one or more status connection signal(s) may be transmitted from the call center 46, and emission of the audio output may be ceased in response thereto. If the service advisor 54 attempts to reestablish the communication during emission of the aural connection status signal, the telematics unit 18 may interrupt the aural signal and reconnect the communication line. In another embodiment, the telematics unit 18 may not interrupt the aural signal and may reestablish the communication line after completion of the aural signal.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct communication and indirect communication. As such, indirect communication may include communication between two components with additional component(s) located therebetween.

While several embodiments have been described in detail, it will be apparent to those skilled in the art that the disclosed embodiments may be modified. Therefore, the foregoing description is to be considered exemplary rather than limiting.

The invention claimed is:

1. A method for informing an in-vehicle telematics unit user of a connection status, the method comprising:

establishing a connection between a telematics unit and a call center;

initiating a communication between the user and a call center service advisor;

temporarily suspending the communication while maintaining the connection;

transmitting, from the call center, a connection status signal to the telematics unit during the temporarily suspended communication, the connection status signal informing the user of a status of the connection; and restoring the communication between the user and the call center service advisor.

2. The method of claim 1 wherein temporarily suspending the communication includes temporarily suspending a communication line between the user and the call center service advisor.

3. The method of claim 2, further comprising:
receiving, at the telematics unit prior to restoring the communication, an attempt to restore communication signal from the call center indicative of an attempt to restore the communication; and
reconnecting the communication line between the user and the call center service advisor in response to the attempt to restore communication signal.

4. The method of claim 1 wherein the telematics unit is in selective communication with a vehicle audio entertainment system, and wherein the method further comprises:
playing an audio output via the vehicle audio entertainment system in response to the connection status signal; and
ceasing the audio output in response to an attempt to restore communication signal indicative of an attempt to restore the communication.

5. The method of claim 4, further comprising:
receiving, at the telematics unit, the connection status signal;
temporarily switching from a temporarily suspended communication line between the user and the call center service advisor in response to the receipt of the connection status signal; and
activating the vehicle audio entertainment system in response to the receipt of the connection status signal.

6. The method of claim 5, further comprising:
receiving, at the telematics unit, the attempt to restore communication signal;
deactivating the vehicle audio entertainment system in response to the receipt of the attempt to restore communication signal; and
reconnecting the previously temporarily suspended communication line between the user and the call center service advisor in response to the receipt of the attempt to restore communication signal.

7. The method of claim 1 wherein the connection status signal includes at least one of audio signals, visual signals, tactile signals, or combinations thereof.

8. The method of claim 7 wherein the connection status signal includes at least one of an emission from a light emitting diode, an audio message output at predetermined intervals, or a visual message displayed on a user interface panel.

9. The method of claim 7 wherein the connection status signal includes progression information configured to be presented audibly, visually via a Driver Information Display, or combinations thereof.

10. The method of claim 1 wherein the call center service advisor is a human advisor or an automated advisor.

11. The method of claim 1 wherein the connection status signal is not context sensitive.

12. A method of indicating that a connection for communication is active, the method comprising:
initiating a communication via the connection utilizing a vehicle telematics unit;
requesting, by a user of the vehicle telematics unit, a service via the communication;
temporarily suspending the communication while maintaining the connection;
transmitting a connection status signal to the telematics unit, the connection status signal informing the user that the connection remains active;
playing, for the user, a preferred audio output in response to the connection status signal;
transmitting an attempt to restore communication signal to the telematics unit, the attempt to restore communication signal indicative of an intent to resume the communication;
ceasing the preferred audio output in response to the attempt to restore communication signal; and
resuming the communication in response to the attempt to restore communication signal.

13. The method of claim 12 wherein the connection status signal includes at least one of audio signals, visual signals, tactile signals, or combinations thereof.

14. The method of claim 12 wherein the connection extends between the vehicle telematics unit and a call center.

15. The method of claim 14 wherein the call center includes at least one of a human advisor or an automated advisor.

16. A system for informing an in-vehicle telematics unit user of a connection status, the system comprising:
the in-vehicle telematics unit; and
a communication line forming an operative and selective connection between the telematics unit and a call center having at least one call center service advisor;
wherein the connection is adapted to be maintained during a temporary suspension in communication between the user and one of the at least one call center service advisor;
and wherein the call center is configured to transmit a connection status signal to the telematics unit in response to the temporary suspension in communication.

17. The system of claim 16, further comprising a vehicle audio entertainment system in operative and selective communication with the telematics unit, wherein the telematics unit is capable of switching from a communication line between the user and the call center service advisor to the audio entertainment system in response to the connection status signal.

18. The system of claim 16 wherein the at least one call center service advisor includes at least one of a human advisor or an automated advisor.

19. The system of claim 18 wherein the at least one call center service advisor initiates transmission of the connection status signal.

20. The system of claim 16, further comprising a notification system configured to provide at least one of audio notices, visual notices, tactile notices, or combinations thereof to the user in response to the connection status signal, the notice informing the user of the status of the connection.

* * * * *